April 12, 1966 P. H. SNOBERGER 3,245,262
CONTROL APPARATUS
Filed July 22, 1963

INVENTOR:
PHILIP H. SNOBERGER.
ATTORNEY

INVENTOR:
PHILIP H. SNOBERGER.
BY
ATTORNEY

April 12, 1966 P. H. SNOBERGER 3,245,262
CONTROL APPARATUS
Filed July 22, 1963 3 Sheets-Sheet 3

INVENTOR:
PHILIP H. SNOBERGER
BY
ATTORNEY

3,245,262
Patented Apr. 12, 1966

3,245,262
CONTROL APPARATUS
Philip H. Snoberger, Orange, Conn., assignor to Ranco Incorporated, Columbus, Ohio, a corporation of Ohio
Filed July 22, 1963, Ser. No. 296,690
6 Claims. (Cl. 73—368.4)

This application is a continuation in part of my application United States Serial Number 20,849, filed April 8, 1960, and now abandoned.

The present invention relates to control apparatus comprising one or more control devices, such as electric switches, operated sequentially, or otherwise, by a single condition responsive element, for example, a fluid containing expansible member which expands and contracts according the changes in volume of the fluid as effected by changes in temperature.

A principal object of the invention is the provision of a control apparatus of the type mentioned in which a single condition responsive element may actuate a plurality of electrical switches or other suitable control devices, in a predetermined sequence, the sequences being readily determined and capable of simultaneous adjustments to shift the range of conditions to which the apparatus responds.

In carrying out the invention, a frame is provided on which one or more control devices are supported, each device including an actuating member which is moved by a beam which engages a stop for pivoting thereabout to actuate the respective control devices by a condition responsive element which shifts the beams laterally in response to changes in a condition, means being provided for adjusting the angular position of the respective beams relative to the stop for calibrating the individual control devices. Preferably, when a plurality of control devices are employed, a common stop is provided for all of the beams and the position of the stop may be manually altered relative to the beams for selectively increasing or decreasing the degree of movement of the condition responsive element required to actuate all of the control devices. In the case of a temperature responsive element, this adjustment uniformly raises or lowers the temperature responsive range of the control devices. Thus, the invention provides a compact structure in which a series of parallel beams are moved laterally by a common condition responsive element and against a common stop to cause the beams to swing and actuate the respective control devices, screw adjustment means being provided between each stop and beam whereby the respective control devices can be made to operate at a given travel of the condition responsive element.

Other objects and advantages of the invention will be apparent from the following description of a preferred form thereof, reference being made to the accompanying drawings wherein.

In the form of the invention shown, a control apparatus 10 is provided which may be utilized to control, as an example, four different electrical circuits of an air conditioning system, not shown, two of which circuits control first and second compressor motors of the system while the other two circuits control electric motor driven fans having different speeds. It will be understood that the invention may be embodied in control apparatus for regulating other types of equipment.

Figure 1:
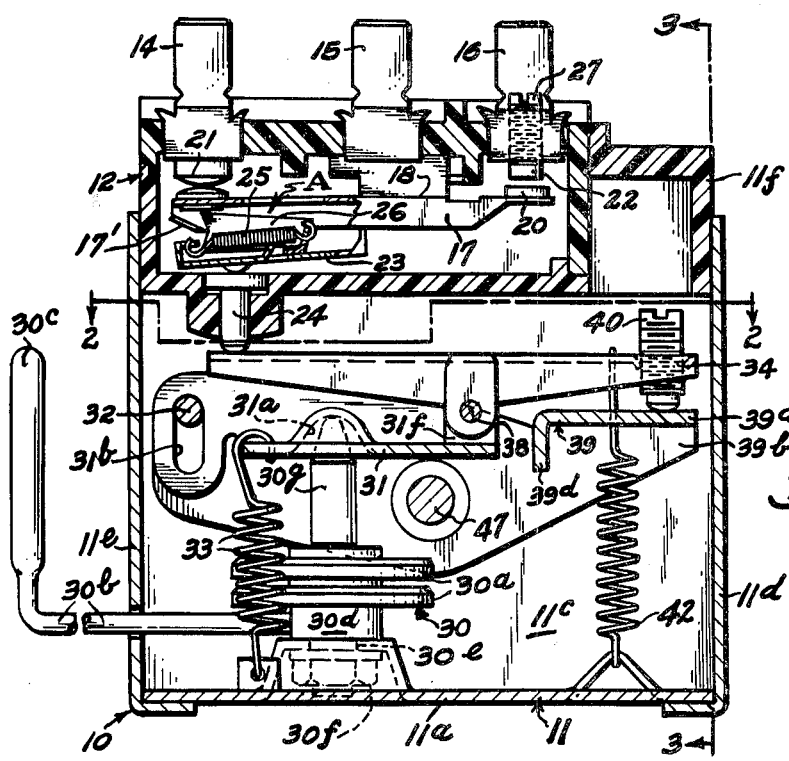
FIG. 1 is a sectional view taken substantially along lines 1—1 of FIG. 2 of a control apparatus embodying the invention, certain parts being broken away.
Figure 2:
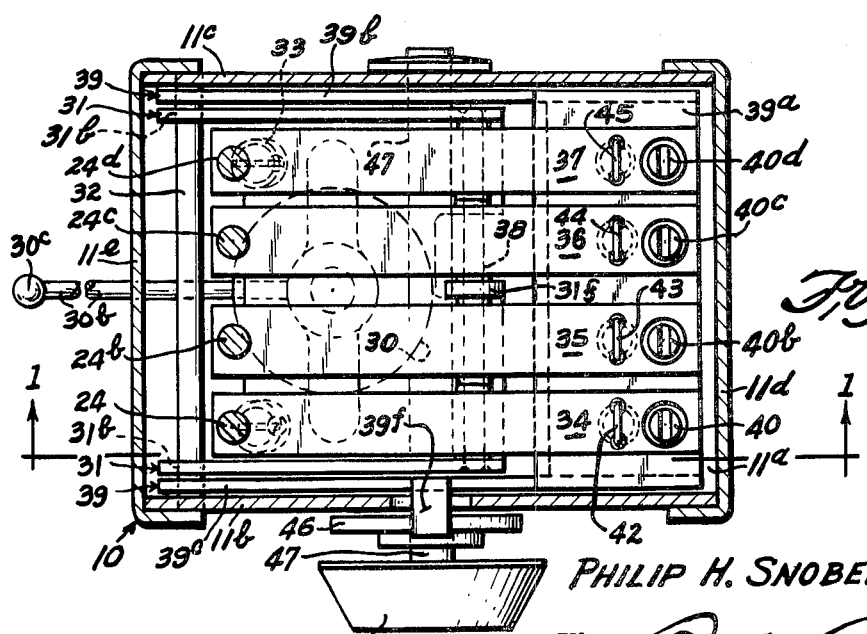
FIG. 2 is a sectional view taken substantially along lines 2—2 of FIG. 1.
Figure 3:
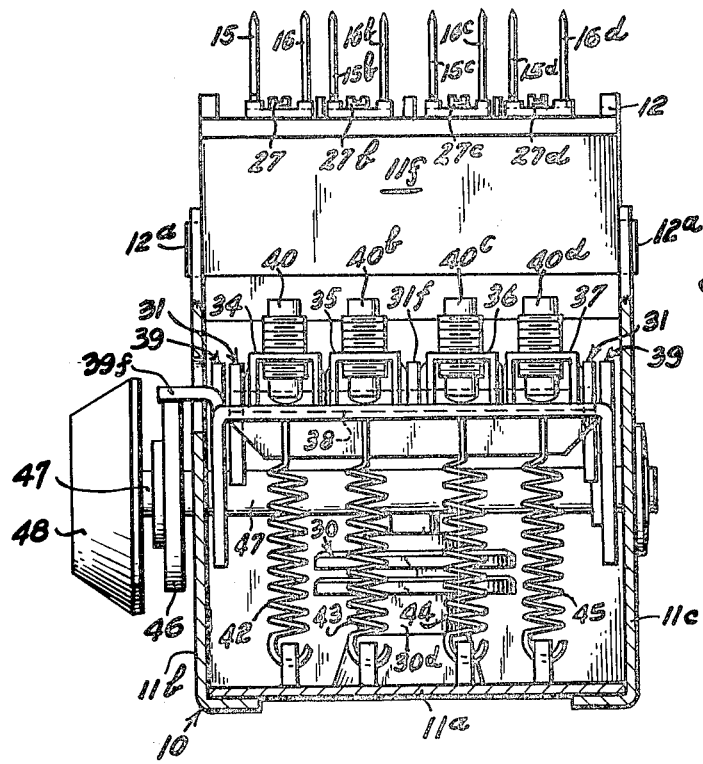
FIG. 3 is a sectional view taken along lines 3—3 of FIG. 1.
Figure 4:
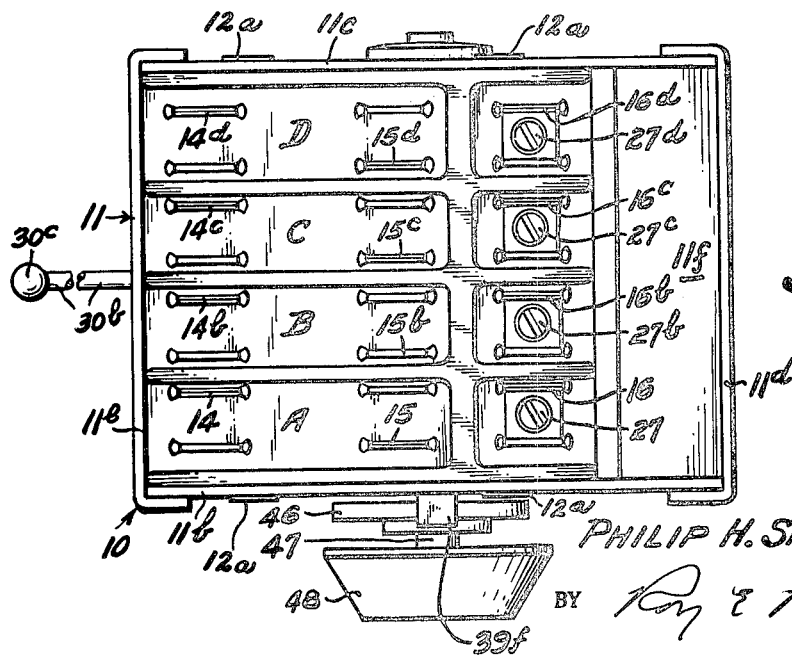
FIG. 4 is a top plan view of the control apparatus with a certain portion removed.
Figure 5:
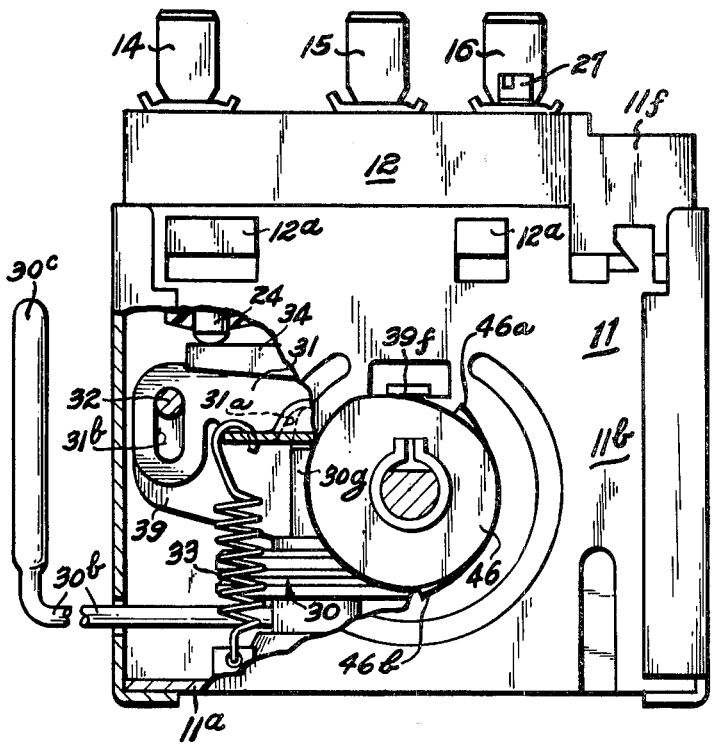
FIG. 5 is a side elevational view of the control apparatus showing certain parts broken away.
Figure 6:
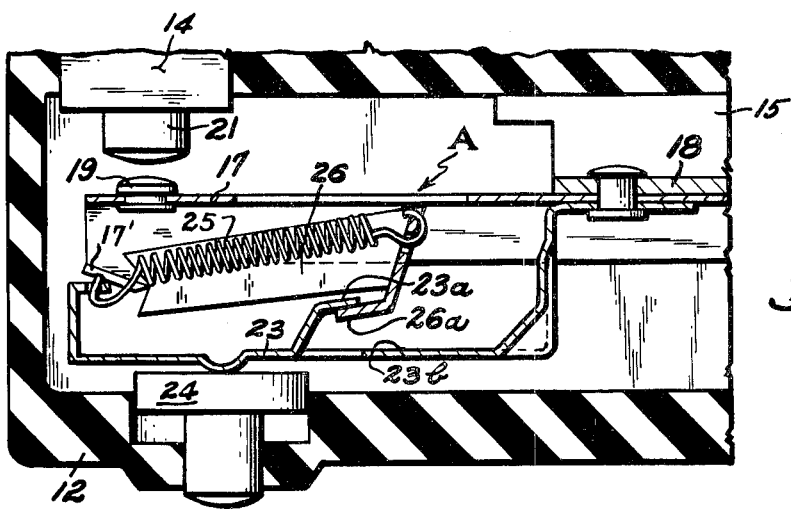
FIG. 6 is a fragmentary view, partly in section and on an enlarged scale, of the switch mechanism shown in FIG. 1, but in a different position.

Apparatus 10 comprises a frame 11 formed of a U-shaped sheet metal which provides a bottom wall 11a, a front wall 11b, and a rear wall 11c. The ends of the frame are closed by covers 11d and 11e which may be secured by detents, not shown. A major area of the open side of the frame, which is the top side, as viewed in FIG. 1, is adapted to be closed by an insulating block 12 which has bosses 12a secured in openings in walls 11b and 11c and which house four snap switch mechanisms A, B, C and D, only one of which is shown at A. All of the switches are identical to switch A and for sake of simplicity only this switch is described in more or less detail, and like parts of the other switches shown have the same reference characters but with suffixed small case letters corresponding to the letter designating the respective switches generally. Switch A includes three terminals, 14, 15 and 16 which are secured in and project upwardly through the top wall of insulating block 12 and are adapted to receive the usual sheath type terminal connectors, not shown, to connect the switches in their respective circuits. The switch mechanisms may be of any suitable form, but preferably snap acting type, and referring to FIGS. 1 and 6, switch A comprises an inverted channel shape spring contact arm 17 pivotally attached to a support 18 integral with central terminal 15. Arm 17 carries contacts 19 and 20 at opposite ends thereof which alternately engage fixed contacts 21 and 22 as the arm is rocked about its pivot, thereby alternately making and breaking circuits through terminal 15 and either of terminals 14 or 16. Arm 17 is snap actuated to its alternate position by a toggle mechanism which includes an actuating arm 23 attached at one end to support 18 and having the other end normally biased downwardly and engaging and following a plunger 24 which is guided for axial movement in a suitable bushing formed in the bottom wall of block 12. Arm 23 is connected by toggle spring 25 to a U-shaped toggle link 26, the end edges of the legs at the open end of which are notched and pivoted to two oppositely disposed inturned tabs 17' formed on the left hand end of arm 17, only one of which tabs appears in the drawings, and the other end of the link is snapped to opposite positions determined by limiting stops formed by a flange 26a on the link and which engages either a tongue 23a, formed on arm 23, or portion 23b of arm 23 depending upon the position of spring 25 relative to its dead center with respect to the link. By urging plunger 24 upwardly arm 23 shifts spring 25 to snap link 26 to the position shown in FIG. 6 so that contact arm 17 is snapped counterclockwise to disengage contacts 19 and 21 and close contacts 20 and 22 and when the plunger is released for downward movement arm 23 follows the plunger by its inherent bias and shifts spring 25 to snap link 26 downwardly to engage 26a with 23b which then causes the link to urge arm 17 clockwise about its pivot to open contacts 20 and 22 and close contacts 19 and 21. The positions of plunger 24 at which contact arm 17 is snapped to close contacts 19 and 21 can be determined, within limits, by the elevation of fixed contact 22 which is attached to the lower end of a screw 27 threaded through an opening in terminal 16, and by turning screw 27 the contact may be raised or lowered as the case may be so as to determine the angle of contact of arm 17 relative to toggle member 26 and spring 25. Plunger 24 may be referred to as a control member which is movable between two positions: i.e., in its upper position it opens contacts 19 and 21, and in its lower position these contacts are closed.

Each snap switch is actuated by a common condition responsive element 30 which in the present instance comprises an expansible metallic bellows 30a having a capillary tube 30b connected thereto. Tube 30b terminates in a bulb 30c, and the bellows, tube and bulb are completely filled with a suitable thermally responsive liquid which expands and contacts upon increase and decrease in temperature to cause expansion and contraction of the bellows according to changes in the volume of the liquid. Bellows 30a is attached to a base 30d which has a neck portion 30e extending through an opening in bottom wall 11a and which is firmly attached to the wall by a nut 30f threaded onto the neck and drawing the shoulder of the base against the inside of the wall. As is well understood in the art, the bulb 30c is disposed in an area the temperature of which is to be controlled, and the top wall of bellows 30 will rise and fall according to temperature changes at the bulb. A post 30g is attached to the top wall of bellows 30a and engages in a recess 31a formed in a channel shape sheet metal lever 31 pivoted at its left hand end on a pin 32 supported in walls 11b and 11c. Preferably, the side flanges of lever 31 project to the left beyond the lever proper and have vertical extending slots 31b through which pin 32 extends, the slots permitting travel of the lever relative to the pin. Normally, however, the pivoted end of lever 31 is retained on pin 32 by a pair of tension springs 33 which are attached to opposite sides of the lever and to frame wall 11a, as shown. By this arrangement it is possible for lever 31 to be raised from its pivot 32 in the event the liquid in bellows 30a expands to an abnormal degree at which parts of the apparatus would be damaged if this movement were not permitted.

Lever 31 carries four parallel rocker arms or beams 34, 35, 36 and 37 on a pivot pin 38 and the left hand ends of the beams engage the respective switch plungers 24, 24b, 24c and 24d and the right hand ends of the beams engage an abutment means in the form of a stop plate 39a. Pin 38 has its ends journaled in openings in the side flanges of lever 31 and the central portion of the pin is supported by an upturned lug 31f of lever 31 to rigidly support the beams. Preferably, beams 34, 35, 36 and 37 are of like construction and each comprises an inverted channel shape metal stamping having a central lug formation in the sides as shown through which pin 38 extends. The right hand end of each has a screw 40 threaded therein, and the lower end of each screw engages stop plate 39a, which comprises a yoke portion of a U-shaped sheet metal lever 39 having the left hand end of the legs thereof straddling lever 31 and pivoted on pin 32. To lend rigidity to lever 39, deep side flanges 39b and 39c are formed thereon and the inner edge portion of stop plate 39a is formed with a stiffening flange 39d. Beams 34–37 are each urged clockwise by tension springs 42, 43, 44 and 45, respectively, connected with the beams and frame as shown, to thereby constantly urge the beams to stop plate 39a. The tension of each spring 42–45 is sufficient to overcome the downward bias of plungers 24 of the respective switches so that as lever 31 is raised and lowered by expansion and contraction of bellows 30a, beams 34–37 rock about their respective ends which engage stop plate 39a and thereby actuate their respective switches. It will also be apparent that the elevations of post 30g of the bellows, which correspond to the temperature at the bulb 30c, at which the various switches are operated can be regulated by adjusting the respective screws 40 to accurately determine the angle of the respective beams relative to the stop plate 39a. Thus, the temperatures at which the individual switches are operated in response to expansion of bellows 30a are independently regulated by adjustment of screws 40 and the temperatures at which they are actuated in response to contraction of bellows 30a are regulated by adjustment of screws 27, 27b, 27c and 27d.

Block 12 terminates short of the right hand end of frame 11, as viewed in FIG. 1 which provides access to screws 40 by a screw driver. This access opening is normally closed by a suitable cover 11f formed of molded insulation material and which is removably attached to the frame by suitable means not essential to this disclosure.

The elevation of stop plate 39a determines the degree of expansion required of bellows 30a to actuate the switching mechanisms at their points of operation. These points correspond to the highest degree of expansion of the bellows, and in order to provide adjustability of this elevation, lever 39 may be moved about its pivot 32 by a manually adjustable cam 46. Cam 46 is attached to one end of a shaft 47 which it rotatably journaled in the opposed side walls 11b and 11c and extends through openings in the side flanges 39c and 39d of lever 39. Flange 39c has an outturned lug 39f which projects through an opening through wall 11b and rides on the periphery of cam 46, the lug being urged to the cam surface by action of springs 42–45 on lever 39. Shaft 47 is rotatably positioned by a knob 48 attached thereto, and the cam has shoulders 46a and 46b which limit rotation thereof in opposite directions by engaging the edges of lug 39f.

It will be seen that by arranging beams 34–47 parallel to one another the sequential operation of the several switch mechanisms can be readily adjusted by screws 40 which are accessible through the top portion of the frame, the cover aligned therewith being removable so that access may be had to the screws. Furthermore, calibration of the control apparatus is facilitated at the factory by reason of the fact that gauging blocks may be inserted between the ends of screws 40 and stop plate 39a when the temperature responsive element 30 is subjected to a given temperature, thereby providing quick adjustments for a series of sequential operating temperatures of the various switches.

It will be appreciated that the arrangement for transmitting movement of the bellows to the switches is particularly suitable for conveniently providing any practical number of switches desired, and although four switches are employed in the form of the invention shown, more or fewer could be employed.

Although but one form of the invention has been described, it will be understood that other modifications, adaptations and uses thereof may be made of the invention, all falling within the scope of the following claims.

I claim:

1. A control apparatus comprising a frame, a control device attached to said frame and including a control member movable between two control positions, a condition responsive element attached to said frame and having a part movable in response to changes in a condition, means interconnecting said element and control member including a beam, means pivotally supporting said beam intermediate its ends and movable by said condition responsive element in a direction to translate the pivotal axis of said beam laterally of said axis in response to a change in condition, abutment means engageable by one end of said beam and about which said beam may pivot when said means supporting said beam is moved by said condition responsive element, the other end of said beam engaging said control member for moving said member by pivotal movement of said beam about said abutment means, and means to adjust the angle of said beam relative to said abutment means.

2. A control apparatus as defined in claim 1 in which said means pivotally supporting said beam comprises a lever engaged by said element and having said beam pivoted thereto.

3. Control apparatus as defined in claim 1 including means to shift said abutment means to change the angular position of said beam relative to said control member.

4. A control apparatus as defined in claim 3 in which said means pivotally supporting said beam comprises a lever engaged by said element and having said beam pivoted thereto.

5. A control apparatus comprising a frame, a plurality of control devices attached to said frame and each including a member movable between two control positions, a condition responsive element attached to said frame and having a part movable in response to changes in a condition, means interconnecting said element and the respective control members including a plurality of beams, means pivotally supporting said beams and intermediate the ends thereof and movable by said condition responsive element in a direction to translate the pivotal axes of said beams laterally of said axes in response to a change in condition, and abutment means engageable by one end of said beams and about which said beams may pivot when said means supporting said beams are moved by said condition responsive element, the other end of said beams engaging the respective control members for moving said members by pivotal movement of said beams about said abutment means.

6. Control apparatus as defined in claim 5 in which said abutment means comprises a member engaged by said beams, and means to shift the last mentioned member in a direction to tend to shift said beams in one direction or the other about their pivots.

References Cited by the Examiner
UNITED STATES PATENTS 2,923,153   2/1960   Westman _____ 73—102

LOUIS R. PRINCE, *Primary Examiner.*

J. RENJILIAN, *Assistant Examiner.*